Feb. 16, 1926.  
L. G. GATES  
1,573,389  
METHOD OF AND APPARATUS FOR BREAKING EMULSIONS  
Filed May 14, 1925
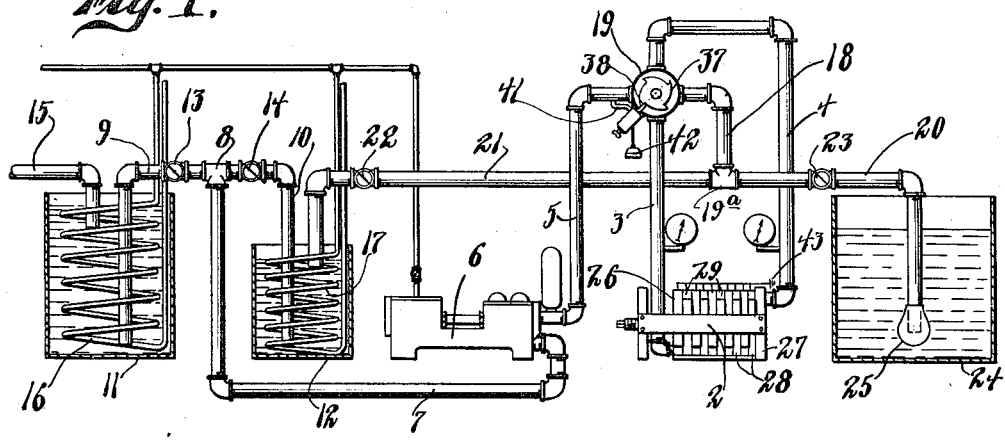
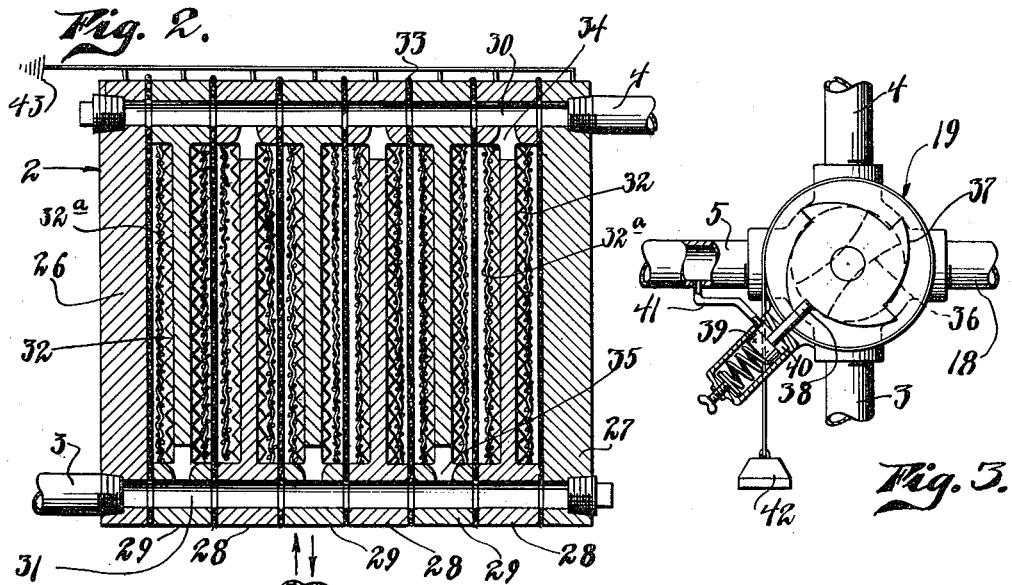
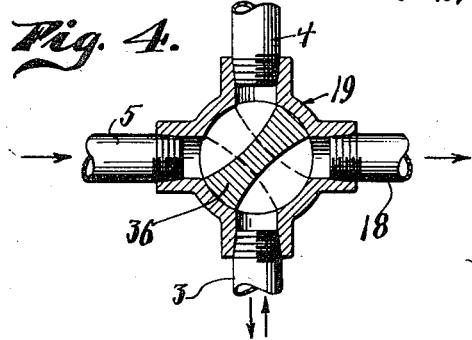
Inventor.  
Leroy G. Gates.  
By Lyon & Lyon  
ATTORNEYS.

Patented Feb. 16, 1926.

1,573,389

UNITED STATES PATENT OFFICE.

LEROY G. GATES, OF BAKERSFIELD, CALIFORNIA, ASSIGNOR TO STANDARD OIL COMPANY, OF SAN FRANCISCO, CALIFORNIA, A CORPORATION OF CALIFORNIA.

METHOD OF AND APPARATUS FOR BREAKING EMULSIONS.

Application filed May 14, 1925. Serial No. 30,193.

*To all whom it may concern:*

Be it known that I, LEROY G. GATES, a citizen of the United States, residing at Bakersfield, in the county of Kern, State of California, have invented a new and useful Method of and Apparatus for Breaking Emulsions, of which the following is a specification.

This invention relates to a method of and apparatus for breaking emulsions, and while not necessarily limited thereto, refers particularly to the treatment of water emulsions of crude oil.

Asphaltic base petroleum oil, such as is found in California, contains very frequently a considerable amount of water in the form of an emulsion. In this emulsion, it is found that the water is in the form of very finely divided microscopic drops surrounded by oil. It has been found that these small water particles are negatively charged with electricity and that the oil immediately surrounding these water particles carries a positive charge which is exactly equal to the negative charge of the water particle. One of the main forces for keeping oil and water in the form of an emulsion is the attraction between these two unlike electric charges.

It is an object of the present invention to provide a method and apparatus for breaking emulsions which operates to break the emulsion by placing on both the water and oil phase of the emulsion a like electrical charge. Specifically, in the case of the water and oil emulsion referred to, the method and apparatus of the present invention is designed to remove the positive charge on the oil phase of the emulsion and give it a negative charge. When this has been accomplished, the negative charge remaining on the water and the negative charge imposed on the oil phase through repulsion, will operate to throw out the water from the emulsion, permitting the same to be separated from the oil by gravity or any other well known means.

The method and apparatus of the present invention involves the use of principles of static electricity to effect economically this equalization of the electric charges of the emulsion. According to the well known principles of static electricity, when any two dissimilar substances are brought into intimate contact and separate, each will be found to possess a charge of electricity, one substance being positively charged and the other negatively charged, the two charges being equal in amount.

I have discovered that when petroleum oil is brought into intimate contact with certain definite substances, such as cotton, monel metal, iron, etc., the oil on separation from this contact will be negatively charged, the substance from which it is separated being positively charged. The intimate contact between the oil or the oil of a water-and-oil emulsion and such substance may be secured by filtering the oil or oil-and-water emulsion through such material. It has also been found that it is necessary for practical or commercial operation to provide for the continual removal of the charge placed upon this filtering material, as otherwise the accumulation of a high positive charge thereon will prevent such contact and separation imparting the desired negative charge to the oil phase of the emulsion. This continual removal of such electric charge is most readily effected by the provision of a positive ground connected to the filtering material.

The filtration of a normal oil-and-water emulsion to impose a negative charge on the oil phase of the emulsion is accompanied, in practice, by a separation of different materials from the emulsion, which accumulate upon the filter medium, soon clogging the same, and preventing further operation until this material is removed. This difficulty is overcome in the method and apparatus of the present invention by the employment of an apparatus and method which will allow flow of emulsion through the filter medium in either direction, the same being supported on both sides. When, by filtration of emulsion through the filter medium in one direction, the filter medium becomes clogged by the separation from the emulsion of different materials such as suspended mineral matter, petroleum salts, and colloidal asphalt, the direction of flow of the emulsion is reversed, carrying away from the filter medium the clogging material and permitting a continuation of the demulsifying process without requiring the apparatus to be taken down and cleaned.

Various other objects, advantages and features of the present invention will be understood from a description of a preferred form of the method and apparatus for breaking emulsion embodying my invention, for which purpose reference is made to the accompanying drawings, which illustrate diagrammatically a preferred example of an apparatus embodying the invention and through the use of which the preferred method may be carried out.

In the drawings:—

Fig. 1 is a diagrammatic side elevation of a preferred form of apparatus.

Fig. 2 is an enlarged elevation in vertical section of the filter-press of the apparatus.

Fig. 3 is an enlarged elevation of the reversing valve; and

Fig. 4 is a similar view in vertical section.

Referring to the drawings, the apparatus there illustrated comprises a filter-press 2 adapted to receive an oil emulsion through either lines 3 or 4 as desired, the oil passing thereto from the line 5 connected to the outlet end of a pump 6, the inlet end of which is connected by a line 7 through a T 8 to lines 9 and 10 leading to tanks 11 and 12 respectively. 13 and 14 respectively indicate valves for the lines 9 and 10. 11 is a tank for the crude oil to be demulsified and receives the emulsion from a line 15. The tank 11 is also preferably provided with suitable means to heat the emulsion therein, such as a steam coil 16. A tank 12 is employed for receiving part of the treated stock which it is desired to re-treat in the apparatus, and also is preferably provided with suitable heating means such as the steam coil 17.

18 indicates a discharge line connected with lines 3, 4 and 5 by an automatic reversing valve 19, the construction of which will be hereinafter described. Said reversing valve leads from the T 19 to lines 20 and 21, the line 21 being controlled by valve 22 and discharging into tank 12, the line 20 being provided with a valve 23 and discharging into a separation tank 24. The end of the line 20 is indicated as covered by a screen 25 of a material for applying additional static charges of electricity, preferably in the form of a bag of burlap, coarse cotton cloth, or the like.

Now referring to the construction of the filter-press 2, said press preferably is provided with end plates 26 and 27, and with a plurality of like intermediate plates 28 and 29, the plates 28 and 29 being assembled in reverse position within the press. The plates 28 and 29 have upper aligned transverse passages 30 in their top corner wall connected with the line 4, and lower aligned transverse passages 31 in one of the lower corner walls connected with the line 3. Each of the plates preferably includes the usual pyramided or grooved surface plate 32 of reduced thickness, against which is placed on both sides, a backing or support 32ª, preferably a copper screen for the filter or medium employed for imposing static charges on the oil, and against each plate or support 32ª is then placed the filter medium 33, these mediums extending entirely through the plates, there thus being two of the mediums 33 between each plate 28 and 29. Each of the plates 28 has an opening 34 connecting its opening 30 with the rear face of the filter medium on both sides of its studded plates 32, and each of the plates 29 has a similar opening 35 connecting its opening 31 with the rear face of the filter medium. The filter mediums may be of various materials, such as cotton cloth or monel metal screen, the mediums being both adapted to impart the desired electric charge to the emulsion and adapted to conduct the charge away so that the medium is continually adapted for breaking the emulsion.

By this construction, when the emulsion is passing to the filter-press from line 3, it is passed through the openings 35 and along the grooves or studded faces of the plates 32, through the filter medium, to the plates 28, and hence out openings 34. By passing the oil to the press from line 4, it may pass first through openings 34 through the filter medium and out through openings 35 and line 3, the filter medium being supported in both directions of passage of the emulsion.

Now referring to Figs. 3 and 4, the apparatus is preferably provided with an automatic reversing valve 19 connecting the lines 3, 4, 5 and 18, of which 36 indicates a rotary valve member connected to a ratchet wheel 37, said ratchet wheel being adapted to make engagement with a dog 38 carried by a piston 39, yieldingly mounted within a chamber 40. The chamber 40 is connected by lines 41 with an inlet line 5.

The operation of such reversing valve is as follows: When the press becomes clogged, the pressure in the supply line 5 increases, forcing the piston 39 back against the spring 48 and releasing the dog 38 from the ratchet wheel 37. The weight 42 then rotates the ratchet wheel to reverse the direction of flow in lines 3 and 4. This releases the back pressure and the pawl or dog again engages the wheel to hold the valve in the new position.

The operation of the method may now be described:

The emulsion to be treated is preferably heated in a tank 11 to a temperature between 130° F. and 200° F., although it is not intended to limit the invention to the employment of any particular temperature. The oil is heated in order to decrease the viscosity of the same and facilitate separation of the oil and water therein after the breaking of the emulsion in the filter-press 2. The heated oil is drawn by pump 6 through line 7 and passes through line 5 either to lines 3 or 4, hence to filter-press 2 and out line 18, usually to separation tank 24. The emulsion passing through the filter-press is brought into extremely intimate contact with the filter cloths 33 which are both conductive to static electricity and adapted for making and breaking contact with the emulsion to impart a negative charge to the oil phase of the emulsion. This negative charge must be continually supplied to the filter cloths 33, for which purpose each of the filter plates 28 and 29 is positively connected with a source of such static charges, such as the earth, the plates being indicated as grounded by line 43. The mass leaving the filter then has both its water and oil phase negatively charged and, when permitted, will stratify.

To lengthen the time between reversals and to increase the rate of flow utilizable in the apparatus, a filter and such as diatomaceous earth, sand or the like may be used. The filter aid operates to collect foreign matter, such as soap, asphalt matter and the like, which may be in the emulsion and prevent such foreign matter from separating out on the cloths and clogging the same. This allows the method apparatus to work at a higher rate and for a longer period of time. The use of such filter aid, while it does not destroy the emulsion breaking action, does produce a mixture of water and oil in which the water drops are very small and settle very slowly especially from a viscous oil. An important feature of the invention is the discovery that a further filter screen 25, such as a burlap bag would cause the water drops to gather from drops of enlarged size which settle out extremely rapidly. The action is thought to be due to the screen applying increased negative charge to the mixture and will demulsify and reemulsify oil.

As the emulsion passes through the filter-press 2, material from the emulsion is filtered out upon the cloths 33, eventually clogging the same. This material can be removed therefrom by reversing the direction of flow of the emulsion through the press, as is accomplished by the automatic reversing valve 19. It is of course understood that the direction of flow may be reversed through the manually actuated valves if preferred.

The material passing into tank 24 is permitted to stratify or separate in any other desired manner. As the impurities of the crude emulsion pack on the static demulsifying medium on the filter and thereover, the pressure in line 5 will continually increase, making it necessary to reverse the direction of flow of the emulsion. This is accomplished either by manual manipulation of valves or by the automatic valve illustrated. At the starting of the process, or during reversing periods, the material leaving the press may be directed by manipulation of valves 23 and 22 back through line 21 to tank 12, to be recirculated.

An important feature of the process is the positive removal from the filtering medium of the static charge which would otherwise accumulate thereon. By the term "positively removing the charge" is meant to exclude processes in which the static charge is permitted to slowly dissipate to the atmosphere from the filtering medium or in which this static charge accumulating under the filtering medium is permitted to slowly leak to the ground. In place of such slow dissipation, of the static charge, the term "positively removing the charge" is intended to be limited to and include the free passage of the charge from the filtering medium to a zone such as the earth, capable of continuously absorbing the charge from the filtering medium and neutralizing the filtering medium.

While the method and apparatus herein described for breaking emulsions is well suited for accomplishing the objects of the present invention, various modifications may be made without departing from the spirit of the invention, and this invention is not limited to the specific method and apparatus described for the purpose of illustrating the invention, but is of the scope set forth in the appended claims.

I claim:—

1. A process of breaking emulsions, which includes bringing the particles of the emulsion into intimate contact with and separating them from a medium which is both a conductor of static electricity and is adapted to bring both phases of the emulsion to the same electrical charge, and positively removing the charge imparted to said medium.

2. A process of breaking crude oil emulsions, which comprises imparting a negative charge to the oil phase of the emulsion by contact and separation with a positively grounded conductor of static electrictiy.

3. A process of breaking crude oil emulsions, which comprises heating the same and pumping the same through a filter to a separation tank, the filter having a static demulsifying medium positively grounded to the earth.

4. A process of breaking crude oil emulsions, which comprises heating the same and pumping the same through a filter to a separation tank, the filter having a static demulsifying medium positively grounded to the earth, the demulsified oil passing through a second static demulsifying medium at the point of discharge into the separation tank.

5. The process of continually breaking emulsions, which includes passing the emulsion through a medium conductive to static electricity and operative to bring both constituents of the emulsion to the same electric charge upon intimate contact and separation between the particles of the emulsion and the medium, and periodically reversing the direction of flow through such medium to remove therefrom impurities separating from the emulsion.

6. The process of continually breaking emulsions, which includes passing the emulsion through a medium conductive to static electricity and operative to bring both constituents of the emulsion to the same static charge upon intimate contact and separation between the particles of the emulsion and the medium, positively removing the charge imparted thereby to the medium, and periodically reversing the direction of flow through such medium to remove therefrom impurities separating from the emulsion.

7. A process of continually breaking emulsions, which includes passing the emulsion through a medium conductive to static electricity and operative to bring both constituents of the emulsion to the same electric charge upon intimate contact and separation between the particles of the emulsion and the medium, positively removing the charge imparted thereby to the medium, passing the treated emulsion to a point of separation, the emulsion being there forced through a second medium, and periodically reversing the direction of flow through said first medium to remove therefrom impurities separating from the emulsion.

8. In a device of the class described, a filter medium conductive to static electricity and operative upon intimate contact and separation with an emulsion to bring both substances of the emulsion to the same electric charge, means forming a conductive filter backing on each side of said medium, means for passing an emulsion through the filter medium in either direction.

9. In a device of the class described, a filter medium conductive to static electricity and operative upon intimate contact and separation with an emulsion to bring both substances of the emulsion to the same electric charge, means forming a conductive filter backing for said medium, and means positively grounding the medium to prevent accumulation of a static charge thereon.

10. In a device of the class described, a filter medium conductive to static electricity and operative upon intimate contact and separation with an emulsion to bring both substances of the emulsion to the same electric charge, means forming a conductive filter backing on each side of said medium, means for passing an emulsion through the filter medium in either direction, and means positively grounding the medium to prevent accumulation of a static charge thereon.

11. A device as in claim 8, provided with automatic means for reversing the direction of flow of the emulsion.

12. A device as in claim 10, provided with automatic means for reversing the direction of flow of the emulsion.

13. A device as in claim 8, having a discharge to a stratifying tank, and an additional filter medium at the end of such discharge.

14. A device as in claim 9, having a discharge to a stratifying tank, and an additional filter medium at the end of such discharge.

15. A device as in claim 10, having a discharge to a stratifying tank, and an additional filter medium at the end of such discharge.

Signed at Bakersfield, Calif., this 24th day of April, 1925.

LEROY G. GATES.